US008021903B2

(12) United States Patent
Chang et al.

(10) Patent No.: US 8,021,903 B2
(45) Date of Patent: Sep. 20, 2011

(54) METHOD FOR FABRICATING MICRO-LENS AND MICRO-LENS INTEGRATED OPTOELECTRONIC DEVICES USING SELECTIVE ETCH OF COMPOUND SEMICONDUCTOR

(75) Inventors: Ki-Soo Chang, Gwangju (KR); Yong-Tak Lee, Gwangju (KR); Alameh Kamal, Joondalup (AU)

(73) Assignees: Ytel Photonics Inc., Gwangju (KR); Edith Cowan University, Joondalup (AU)

( * ) Notice: Subject to any disclaimer, the term of this patent is extended or adjusted under 35 U.S.C. 154(b) by 471 days.

(21) Appl. No.: 12/085,585

(22) PCT Filed: Nov. 28, 2006

(86) PCT No.: PCT/KR2006/005048
§ 371 (c)(1),
(2), (4) Date: Oct. 8, 2008

(87) PCT Pub. No.: WO2007/061271
PCT Pub. Date: May 31, 2007

(65) Prior Publication Data
US 2009/0068775 A1    Mar. 12, 2009

(30) Foreign Application Priority Data
Nov. 28, 2005    (KR) .................. 10-2005-0114145

(51) Int. Cl.
*H01L 21/00* (2006.01)
(52) U.S. Cl. ................... 438/29; 438/93; 257/E33.072; 257/E33.073

(58) Field of Classification Search ............... 438/22, 438/23, 29, 69, 72, 87, 93; 257/E33.001, 257/E33.068, E33.072, E33.073, E33.074
See application file for complete search history.

(56) References Cited

U.S. PATENT DOCUMENTS

| 5,471,948 | A  | * | 12/1995 | Burroughes et al. | ............ 438/93 |
| 5,633,527 | A  | * | 5/1997 | Lear | ............... 257/432 |
| 6,215,134 | B1 | * | 4/2001 | O'Brien et al. | ................ 257/98 |
| 6,548,144 | B1 |   | 4/2003 | Teshima et al. | |
| 6,661,581 | B1 | * | 12/2003 | Sankur | ......... 359/653 |
| 2002/0196563 | A1 |   | 12/2002 | Itoh | |
| 2004/0027680 | A1 |   | 2/2004 | Ozawa | |
| 2007/0035847 | A1 | * | 2/2007 | Li et al. | ........ 359/642 |

OTHER PUBLICATIONS

Chang et al., "Self-Aligned Microlens-Integrated Vertical-Cavity Surface-Emitting Lasers", IEEE Photonics Technology Letters, vol. 18, Nov. 1, 2006, pp. 2203-2205.*

* cited by examiner

*Primary Examiner* — Michael Lebentritt
*Assistant Examiner* — Daniel Whalen
(74) *Attorney, Agent, or Firm* — Harness, Dickey & Pierce, P.L.C.

(57) ABSTRACT

Provided are a method of fabricating a microlens using selective etching of a compound semi-conductor and a method of fabricating a photoelectric device having the microlens. The formation of the microlens includes patterning a compound semiconductor layer and removing a lateral surface of the compound semiconductor layer to form a roughly hemispheric lens. The lateral surface of the compound semiconductor layer is removed by a digital alloy method. In particular, the lateral surface of the compound semiconductor layer is removed by a wet etching process.

15 Claims, 3 Drawing Sheets

METHOD FOR FABRICATING MICRO-LENS AND MICRO-LENS INTEGRATED OPTOELECTRONIC DEVICES USING SELECTIVE ETCH OF COMPOUND SEMICONDUCTOR

TECHNICAL FIELD

The present invention relates to methods of fabricating a microlens and a photoelectric device using the microlens, and more particularly, to methods of fabricating a microlens using selective etching of a compound semiconductor and a photoelectric device having the microlens.

BACKGROUND ART

In recent years, the downscaling of optical systems has lead to a strong need for integration of a photoelectric device with an optical device, thus increasing the necessity and applicability of microlenses. A microlens may be integrated in a light source in order to efficiently combine optical fiber with the light source in an optical communication system, so that the entire packaging cost can be reduced. Also, since the microlens may be integrated in an optical detector to condense light into an active layer of the optical detector, the efficiency of the optical detector may be enhanced. Further, the microlens may be formed over a color filter of an image sensor to elevate the light sensitivity of the image sensor.

The necessity of the microlens in an optical interconnection system has been highlighted lately, and a vertical cavity surface emitting laser (VCSEL) is being watched with keen interest as an ideal light source for a parallel optical interconnection system because of its many structural advantages. Above all, a VCSEL with oxide current apertures has many strong points, for example, a low threshold current, high photoelectric conversion efficiency, and a single-mode operation, due to its small active region.

However, since laser beams irradiated from a surface are greatly diffused, when the VCSEL is applied to a free-space optical interconnection system, crosstalk may increase between channels, and an optical transmission distance and a tolerance in optical alignment are limited. Also, in a chip-to-chip optical interconnection system using an optical waveguide as a light transmission medium, combination efficiency between the light source and the optical waveguide is restricted by diffusion of laser beams. Therefore, by integrating the microlens into the photoelectric device, the packaging cost of systems can be reduced.

FIGS. 1 through 3 are cross-sectional views illustrating a conventional process of fabricating a microlens using the reflow of photoresist or polymer such as polyimide.

Referring to FIG. 1, a conventional method of fabricating a microlens includes depositing a polymer material 1 on a semiconductor substrate 2, patterning the polymer material 1, forming a cylindrical pattern of the polymer material 1 using a typical photolithography process as shown in FIG. 2, and reflowing the polymer material 1 by heating the resultant structure.

When the reflow process is finished, the microlens is fabricated as shown in FIG. 3 based on the property of the polymer material 1 that forms a curved surface due to surface tension. Alternatively, the polymer material 1 may be dry-etched as a lens type to form the microlens on the substrate 2.

Since a photoelectric device into which the above-described microlens is integrated can be applied to a system without optically aligning an external lens with the photoelectric device, the packaging cost of the system can be reduced, and the packaged system can be scaled down.

FIG. 4 is a cross-sectional view of a VCSEL into which a conventional microlens is integrated.

Referring to FIG. 4, the VCSEL includes a microlens 201 which is formed on a substrate 2 by reflowing or dry etching a polymer material. The use of the microlens 201 leads to a reduction in an emission angle of a laser beam 11. Also, the microlens 201 can be applied to an optical communication system or an optical interconnection system without an additional external lens.

The above-described VCSEL includes a p-type metal layer 3, an upper Bragg mirror 4, an aluminum oxide layer 5, an active layer 6, a lower Bragg mirror 7, and a current aperture 8.

However, the above-described method makes it difficult to fabricate a high-density microlens array. Specifically, when a distance between lenses is small, adjacent lenses are brought into contact with each other during a reflow process, so that a desired microlens array cannot be obtained. Also, since the microlens 201 can be fabricated only on the substrate 2, a bottom surface of the substrate 2 need to be polished to reduce scattering, and an anti-reflective coating (ARC) layer 10 should be coated on the substrate 2 and then the microlens 201 should be formed thereon in order to eliminate a Fabry-Perot resonator effect. Further, a photoelectric device 200 should be precisely aligned with the microlens 201 during a photolithography process, thus making an integration process complicated.

DISCLOSURE OF INVENTION

Technical Problem

The present invention is directed to a microlens and a method of fabricating a microlens using selective removal of a compound semiconductor.

The present invention is also directed to a method of fabricating a photoelectric device having the microlens.

Technical Solution

One aspect of the present invention provides a method of fabricating a microlens. The method includes: forming a compound semiconductor layer having a reactive metal on a substrate; etching the compound semiconductor layer, and forming a compound semiconductor layer pattern; and partially removing a lateral surface of the compound semiconductor layer pattern, and forming a lens layer, wherein the compound semiconductor layer is formed by a digital alloy method, the compound semiconductor layer includes a reactive layer containing the reactive metal and a semiconductor layer composed of a compound semiconductor containing no reactive metal, and the concentration of the reactive metal is higher in an upper position of the compound semiconductor layer.

Another aspect of the present invention provides a method of fabricating a microlens. The method includes: forming a compound semiconductor layer on a substrate by repeatedly stacking a reactive layer containing a reactive metal and a semiconductor layer containing no reactive metal using an epitaxial growth process, the reactive layer being thicker in an upper position of the compound semiconductor layer; forming a screen layer on the compound semiconductor layer to protect a top surface of the compound semiconductor layer; selectively etching the compound semiconductor layer and the screen layer, and forming a compound semiconductor layer pattern and a screen layer pattern; forming a lens layer by etching a lateral surface of the compound semiconductor layer pattern, wherein an upper portion of the compound semiconductor layer pattern, in which the content of the reactive metal is high, is etched at a high etch rate, and a lower portion of the compound semiconductor layer pattern, in which the content of the reactive metal is low, is etched at a low etch rate; and removing the screen layer pattern remaining on the lens layer, and exposing the lens layer.

Still another aspect of the present invention provides a microlens fabricated by a method comprising: forming a compound semiconductor layer having a reactive metal on a substrate; etching the compound semiconductor layer, and forming a compound semiconductor layer pattern; and partially etching a lateral surface of the compound semiconductor layer pattern, and forming a lens layer, wherein the compound semiconductor layer is formed by a digital alloy method and includes a reactive layer containing the reactive metal and a semiconductor layer composed of a compound semiconductor containing no the reactive metal, and the concentration of the reactive metal is higher in an upper position of the compound semiconductor layer.

ADVANTAGEOUS EFFECTS

As described above, a compound semiconductor layer is formed by a digital alloy method such that the concentration of a reactive metal varies with height. Also, the compound semiconductor layer having the reactive metal, of which concentration varies with height, is partially removed to form a circular or elliptical microlens. In this process, a high-density microlens array can be fabricated. Further, since the microlens is formed of a compound semiconductor, the microlens can be monolithically grown on a substrate of the photoelectric device, and an improvement in the characteristics of the photoelectric device can be facilitated. In addition, when a photoelectric device into which a microlens is integrated is fabricated, the center of the microlens may be self-aligned with an active layer of the photoelectric device, so that the microlens can be integrated without a typical photolithography process. As a consequence, a fabrication process can be simplified, and the packaging cost of an optical communication system or optical interconnection system can be reduced.

MODE FOR THE INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

Exemplary Embodiment

FIGS. 5 through 8 are cross-sectional views illustrating a method of fabricating a microlens using selective etching of a compound semiconductor according to an exemplary embodiment of the present invention.

Figure 1:
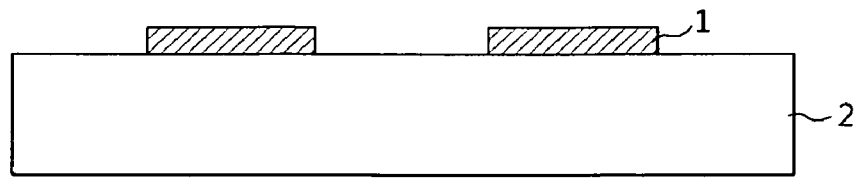
FIGS. 1 through 3 are cross-sectional views illustrating a conventional process of fabricating a microlens using the reflow of photoresist or a polymer material such as polyimide.
Figure 2:
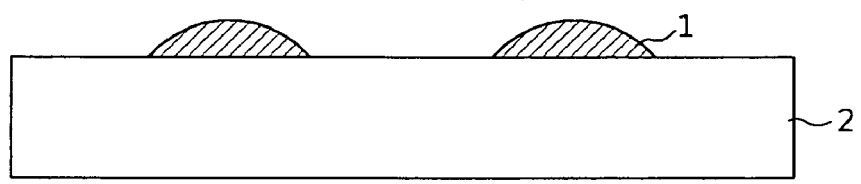
Figure 3:
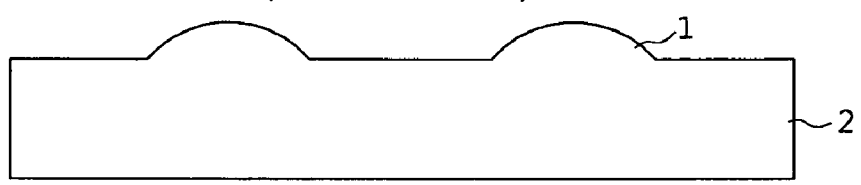
Figure 4:
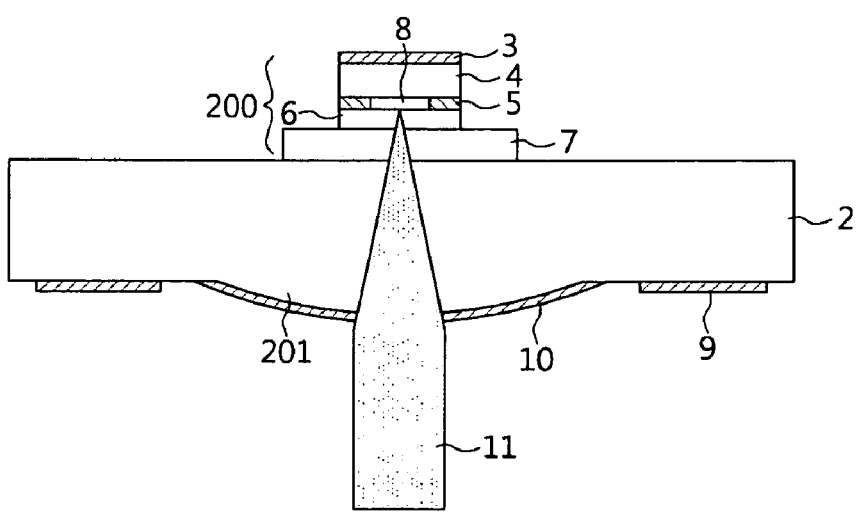
FIG. 4 is a cross-sectional view of a vertical cavity surface emitting laser (VCSEL) into which a conventional microlens is integrated.
Figure 5:
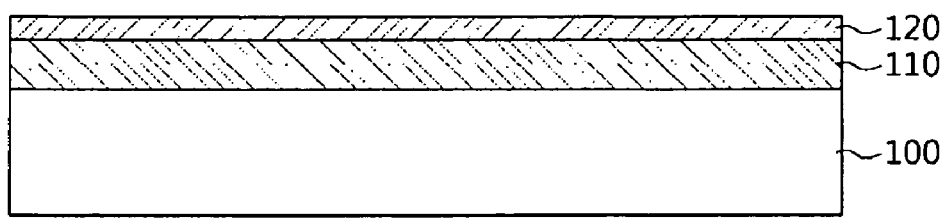
FIGS. 5 through 8 are cross-sectional views illustrating a method of fabricating a microlens using selective removal of a compound semiconductor according to an exemplary embodiment of the present invention.

Referring to FIG. 5, a compound semiconductor layer 110 is formed on a substrate 100. The compound semiconductor layer 110 contains a reactive metal. The reactive metal may be aluminum (Al). Also, the compound semiconductor layer 110 may be formed by an epitaxial growth process. The content of the reactive metal in the compound semiconductor layer 110 is controlled at every stage of the growth process. In other words, the concentration of the reactive metal is increased over time during the growth process.

In order to control the content of the reactive metal at every stage of the growth process, a digital alloy method may be utilized.

Figure 9:
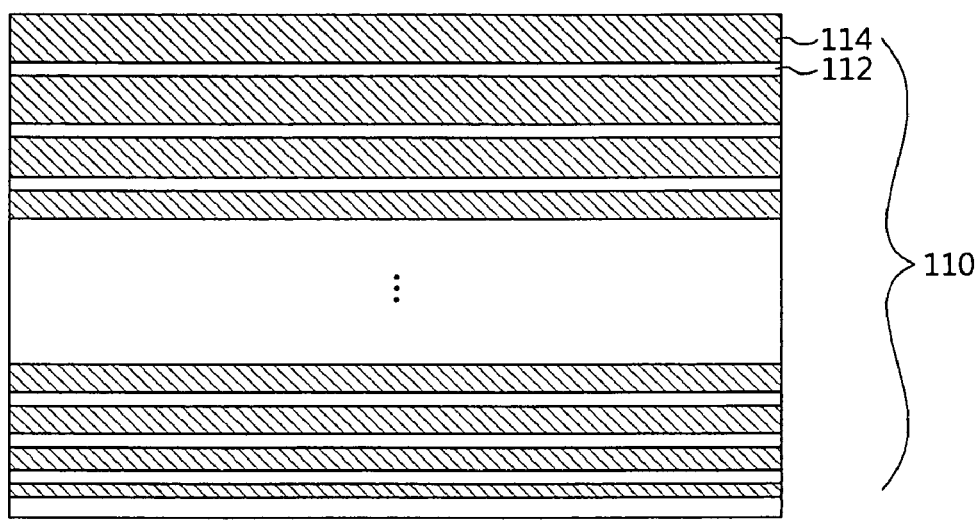
FIG. 9 is a cross-sectional view illustrating a digital alloy method according to an exemplary embodiment of the present invention.

FIG. 9 is a cross-sectional view illustrating a digital alloy method according to an exemplary embodiment of the present invention.

Referring to FIG. 9, the compound semiconductor layer 110 has a structure obtained by repeatedly stacking a reactive layer 114 containing a reactive metal and a semiconductor layer 112 containing no reactive metal. Also, a growth process may be performed such that the reactive layer 114 becomes thicker in an upper position of the stacked structure. Accordingly, the compound semiconductor layer 110 that is vertically grown on the substrate 100 has a higher content of the reactive metal in an upper position of the stacked structure. In this method, the concentration of the reactive metal in the compound semiconductor layer 110 can be precisely controlled. When the reactive metal is aluminum (Al), the reactive layer 114 may be AlGaAs, InGaAlAs, or InGaAlN. Also, the semiconductor layer 112 may be formed of a compound semiconductor layer, such as GaAs, InGaAs, or InGaN, from which the reactive metal is excluded.

Referring again to FIG. 5, a screen layer 120 is formed on the resultant compound semiconductor layer 110. The screen layer 120 may be formed of a material having an etch selectivity or oxidation selectivity with respect to the underlying compound semiconductor layer 110. In a subsequent process of partially etching the compound semiconductor layer 110, the screen layer 120 permits the partial etching to start from a lateral surface of the compound semiconductor layer 110. In other words, the screen layer 120 protects an upper portion of the compound semiconductor layer 110 so that the compound semiconductor layer 110 forms a roughly circular shape. The screen layer 120 may be formed by an epitaxial growth process or a deposition process. Preferably, the screen layer 120 is formed by an epitaxial growth process, which can be performed in-situ with the compound semiconductor layer 110.

Figure 6:
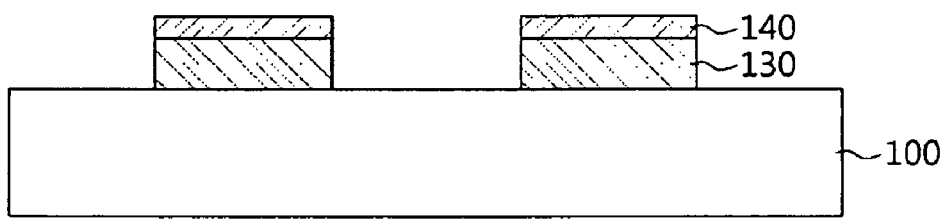

Referring to FIG. 6, the resultant compound semiconductor layer 110 and screen layer 120 are selectively etched to form a compound semiconductor layer pattern 130 and a screen layer pattern 140. The formation of the screen layer pattern 140 and the compound semiconductor layer pattern 130 is carried out using a typical photolithography process. Specifically, photoresist is coated on the screen layer 120 and then patterned to form a photoresist pattern, and the compound semiconductor layer 110 and the screen layer 120 are etched using the photoresist pattern as an etch mask. The etching of the compound semiconductor layer 110 and the screen layer 120 may be performed by a dry etching process or a wet etching process. For example, the etching process may be an anisotropic dry etching process. Also, the compound semiconductor layer 110 and the screen layer 120 may be etched until the surface of the substrate 100 is exposed. When the etching process is completed, the remaining photoresist pattern is removed from the screen layer pattern 140.

Figure 7:
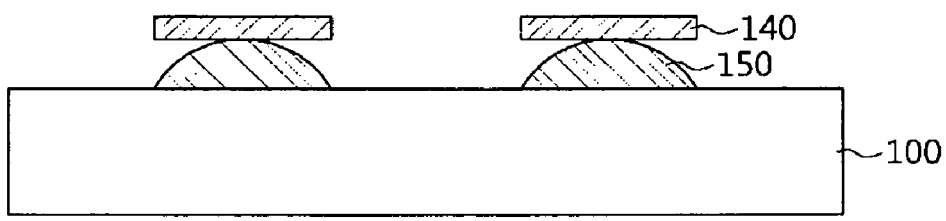

Referring to FIG. 7, the compound semiconductor layer pattern 130 is partially removed to form a lens layer 150. The partial removal of the compound semiconductor layer pattern 130 may be performed by an oxidation process or a wet etching process.

In the case of the oxidation process, the substrate 100 having the compound semiconductor layer pattern 130 is oxidized in an $O_2$ atmosphere at a temperature of 300° C. or higher. The $O_2$ atmosphere may be formed by supplying water vapor to the substrate 100 having the compound semiconductor layer pattern 130. A reactive layer formed in the compound semiconductor layer pattern 130 contains a reactive metal. The contained reactive metal is oxidized during the oxidation process.

Since the compound semiconductor layer pattern 130 has a higher content of the reactive metal in an upper position, the oxidation of the reactive metal starts from a lateral surface of the compound semiconductor layer pattern 130 and becomes more serious in an upper position of the compound semiconductor layer pattern 130. Thereafter, the oxide layer is removed, thus forming the lens layer 150 shown in FIG. 7.

In the case of the wet etching process, the etching of the compound semiconductor layer pattern 130 starts from a lateral surface thereof. When the reactive metal is Al, the wet etching process may be carried out using a buffered oxide etchant (BOE) as an etchant. An upper region of the compound semiconductor layer pattern 130 in which the reactive metal is heavily concentrated is etched at a high rate, while a lower region thereof is etched at a low rate. As a result, the lens layer 150 is formed in a roughly circular shape or elliptical shape as shown in FIG. 7.

Figure 8:
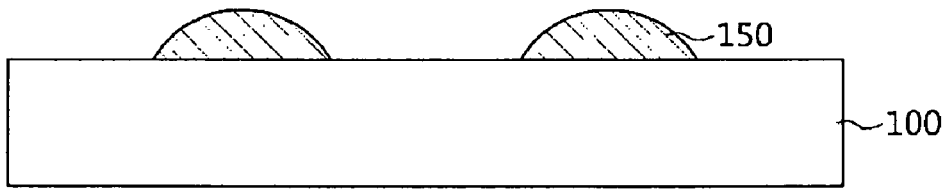

Referring to FIG. 8, the screen layer pattern 140 is removed using a wet etching process or a typical cleaning process to expose the lens layer 150.

Figure 10:
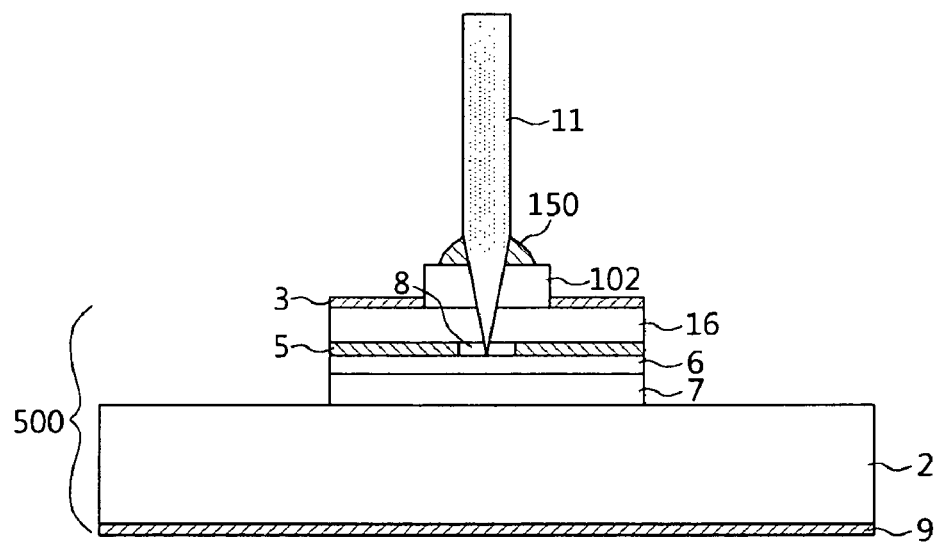
FIG. 10 is a cross-sectional view of a VCSEL fabricated by the microlens fabrication method according to an exemplary embodiment of the present invention.

FIG. 10 is a cross-sectional view of a vertical cavity surface emitting laser (VCSEL) fabricated by the method of fabricating a microlens according to an exemplary embodiment of the present invention.

Here, FIG. 10 only illustrates an exemplary device fabricated by the method of fabricating a microlens described with reference to FIGS. 5 through 9. Therefore, it would be apparent to those skilled in the art that the method according to the present invention is not restricted to the VCSEL shown in FIG. 10 and can be applied to other various fields. Specifically, the microlens fabricated by the method according to the present invention can be utilized for various photoelectric devices, such as a VCSEL, a light emitting diode, an optical detector, or an image sensor.

Referring to FIG. 10, a microlens 150 is formed on a VCSEL 500 that is obtained through a typical fabrication process.

Like a well-known VCSEL, the VCSEL 500 includes a substrate 2, a p-type metal layer 3, an aluminum oxide layer 5, an active layer 6, a lower Bragg mirror 7, an n-type metal layer 9, a p-type ohmic contact layer 16, and an upper Bragg mirror 102.

However, the microlens 150, which is formed on the upper Bragg mirror 102, is the same as described above with reference to FIGS. 5 through 9. Thus, the substrate 100 illustrated in FIGS. 5 through 8 corresponds to the upper Bragg mirror 102 shown in FIG. 10.

Specifically, a compound semiconductor layer pattern and a screen layer pattern are formed on the upper Bragg mirror 102, and the compound semiconductor layer pattern is partially removed to form a lens layer.

INDUSTRIAL APPLICABILITY

According to the present invention as described above, a microlens and a photoelectric device using the same can be fabricated by partially removing a compound semiconductor. Thus, a high-density microlens array can be fabricated, and since the microlens is formed of a compound semiconductor, the microlens can be monolithically grown on a substrate of the photoelectric device, and an improvement in the characteristics of the photoelectric device can be facilitated. Further, when a photoelectric device into which a microlens is integrated is fabricated, the center of the microlens can be self-aligned with an active layer of the photoelectric device, so that the microlens can be integrated without an additional photolithography process. As a consequence, a fabrication process can be simplified, and the packaging cost of an optical communication system or optical interconnection system can be reduced.

While the invention has been shown and described with reference to m certain exemplary embodiments thereof, it will be understood by those skilled in the art that various changes in form and details may be made therein without departing from the spirit and scope of the invention as defined by the appended claims.

The invention claimed is

1. A method of fabricating a microlens, comprising:
   forming a compound semiconductor layer having a reactive metal on a substrate;
   etching the compound semiconductor layer, and forming a compound semiconductor layer pattern; and
   partially removing a lateral surface of the compound semiconductor layer pattern, and forming a lens layer,
   wherein the compound semiconductor layer is formed by a digital alloy method, the compound semiconductor layer includes a reactive layer containing the reactive metal and a semiconductor layer composed of a compound semiconductor containing no reactive metal, and the concentration of the reactive metal is higher in an upper position of the compound semiconductor layer.

2. The method according to claim 1, wherein the compound semiconductor layer is formed by repeatedly stacking the reactive layer and the semiconductor layer, and the reactive layer becomes thicker in an upper position of the compound semiconductor layer.

3. The method according to claim 1, wherein the compound semiconductor layer is formed by an epitaxial growth process.

4. The method according to claim 1, after forming the compound semiconductor layer, further comprising forming a screen layer on the compound semiconductor layer, the screen layer being formed of a material having an etch selectivity with respect to the compound semiconductor layer.

5. The method according to claim 4, wherein the screen layer is formed by an epitaxial growth process.

6. The method according to claim 5, further comprising removing the screen layer remaining on the lens layer after forming the lens layer.

7. The method according to claim 1, wherein partially removing the compound semiconductor layer pattern is performed by a wet etching process.

8. The method according to claim 7, wherein the reactive metal is aluminum (Al).

9. The method according to claim 8, wherein the reactive layer is formed of one selected from the group consisting of AlGaAs, InGaAlAs, and InGaAlN, and the semiconductor layer is formed of one selected from the group consisting of GaAs, InGaAs, and InGaN.

10. The method according to claim 9, wherein the wet etching process is performed using a BOE (buffered oxide etchant) as an etchant.

11. A method of fabricating a microlens, comprising:
forming a compound semiconductor layer on a substrate by repeatedly stacking a reactive layer containing a reactive metal and a semiconductor layer containing no reactive metal using an epitaxial growth process, the reactive layer being thicker in an upper position of the compound semiconductor layer;
forming a screen layer on the compound semiconductor layer to protect a top surface of the compound semiconductor layer;
selectively etching the compound semiconductor layer and the screen layer, and forming a compound semiconductor layer pattern and a screen layer pattern;
forming a lens layer by etching a lateral surface of the compound semiconductor layer pattern, wherein an upper portion of the compound semiconductor layer pattern, in which the content of the reactive metal is high, is etched at a high etch rate, and a lower portion of the compound semiconductor layer pattern, in which the content of the reactive metal is low, is etched at a low etch rate; and
removing the screen layer pattern remaining on the lens layer, and exposing the lens layer.

12. The method according to claim 11, wherein the reactive metal is aluminum (Al).

13. The method according to claim 12, wherein etching the lateral surface of the compound semiconductor layer pattern is performed by a wet etching process using a BOE as an etchant.

14. The method according to claim 12, wherein the reactive layer is formed of one selected from the group consisting of AlGaAs, InGaAlAs, and InGaAlN.

15. The method according to claim 11, wherein the screen layer is formed by an epitaxial growth process performed in-situ during the formation of the compound semiconductor layer.

* * * * *